Dec. 27, 1966 E. E. KOCHANEY 3,293,912
APPARATUS FOR ANALYZING PLASTIC COATING MATERIAL
Filed April 8, 1964
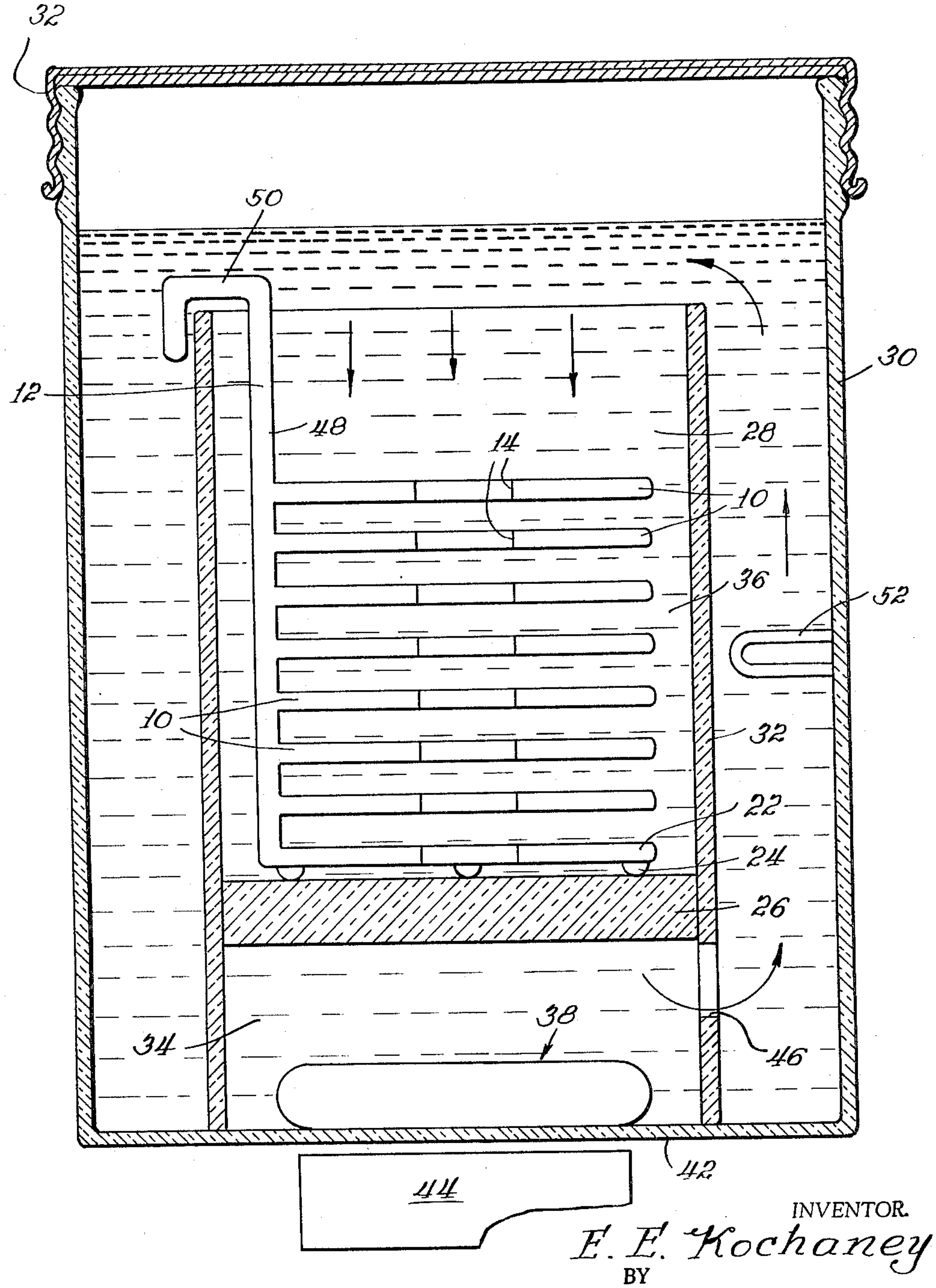
INVENTOR.
E. E. Kochaney
BY
Dominik and Stein
Jerome Rudix
attys.

3,293,912

APPARATUS FOR ANALYZING PLASTIC COATING MATERIAL

Eugene E. Kochaney, Bay City, Mich., assignor to The Dow Chemical Company, Midland, Mich., a corporation of Delaware Filed Apr. 8, 1964, Ser. No. 358,247
3 Claims. (Cl. 73—150)

This invention relates to the analysis of plastic coating material and more particularly to an apparatus for analyzing, comparing and testing plastic destined for use as a coating film. Such coatings and/or films are subjected to a wide variety of uses and to the action of a wide variety of solvents, cleaning agents and the like which may deleteriously affect it by slow or quick chemical or physical reaction.

Many test methods are currently utilized to analyze, compare and test plastic coatings and films. In many instances, these test methods merely test for one characteristic. Some require extensive apparatus. Others are unreliable from plastic to plastic. And others are difficult to manipulate.

An object of this invention is to provide a unique apparatus for identifying plastic.

Another object of this invention is to provide an apparatus which is capable of determining the distribution of plastic in a particular composition or mixture.

Still another object is to provide an apparatus for comparing different samples of plastic.

A further object is to provide an apparatus for analyzing the resistance of plastic to solvent.

A still further object is to provide an apparatus for measuring certain physical and/or chemical characteristics of plastic, such as high gel fraction.

Another object is to provide an apparatus which can accomplish the above objectives and yet be relatively inexpensive.

Another object is to provide an apparatus which can accomplish the above objectives and yet is relatively simple to operate.

Another object is to provide an apparatus which can accomplish the above objectives and which is reliable from sample to sample.

Other objects of the invention will in part be obvious and will in part appear hereinafter.

The invention accordingly comprises the several steps and the relation of one or more of such steps with respect to each of the others and the apparatus embodying features of construction, combination of elements and arrangement of parts which are adapted to effect such steps, all as exemplified in the following details disclosure, and the scope of the invention will be indicated in the claims.

The method, which can accomplish the above objectives broadly comprises the steps of coating the surfaces of one or more tared impervious plates or discs with the plastic to be analyzed. After drying, the coated plates or discs are weighed and then subjected to a fixed amount of a solvent or a solvent-non-solvent mixture of predetermined choice for a fixed period of time at a specific temperature and under uniform agitation conditions. Then the plates or discs are again weighed to determine the loss of plastic to the action of the solvent or solvent-non-solvent mixture. The amount lost is plotted against the percent solvent used, and the curve obtained after a series of runs under different solvent conditions is used to:

(a) Determine the distribution of plastic in the composition analyzed, (b) Compare that plastic to other plastics similarly analyzed, and (c) Analyze for various physical and/or chemical characteristics such as solvent resistency, gel fraction, etc.

The apparatus, in its broadest preferred embodiment, as seen in the drawing comprises a stacked array of plates or discs contained within an easily closeable vessel with means to uniformly agitate the solvent mixture over said plates.

For a fuller understanding of the nature and objects of the invention, reference should be had to the following detailed description taken in connection with the accompanying drawing in which a side cross-sectional view of the apparatus is illustrated.

In the accompanying drawing, there is shown a sectional view of the apparatus for conducting a test, except for ancillary equipment of well known character which requires no illustration.

The material to be tested is applied as a coating to each plate or disc 10, and exposed to direct contact, for a predetermined time, to the action of a fluid medium adapted to either dissolve the coating or particular ingredients of the coating. In either instance, deterioration of the coating results.

The apparatus for practicing the invention comprises a disc array which consists of a plurality of chemically inert plates or discs 10, such as glass, ceramic and the like. These are rigidly held in a coaxial spaced apart relationship by a common vertical support bar 12 integral with a point on the edge of each disc. It is preferred that the discs be uniformly spaced apart. Each disc has a central axial hole 14. The bottom disc has several (preferably three) equally spaced bosses 24 extending downwardly to constitute a three-point support for the coating support.

The disc array rests upon a porous support 26 positioned within an open-ended vertical tubular casing 32. The tubular casing acts as an inner chamber 28. While the support 26 may be a perforated plate or any other porous support means, to secure an effectively gentle and uniform flow of the testing fluid over substantially the entirety of the exposed coating, it is preferred that the supporting plate 26 be made of sintered glass of sufficient porosity to permit a gentle percolation of the testing fluid.

An outer chamber 30, preferably sealed, such as a jar provided with a screw cap is utilized to completely enclose the test chamber. In use both chambers are completely filled with the testing fluid, and the inner cylindrical casing 32 is below the level of such fluid.

Agitating means are provided to maintain gentle percolation of fluid through the test chamber. The flow is preferably a gentle downward movement through the inner chamber 28. The peripheral clearance, at 36, between the edges of the discs 10 and the casing 32 is preferably designed to be approximately the same as the spacing between the discs to avoid unusual eddy currents or faster dissolving action in the area of the inner chamber. The agitating means employed is preferably a magnetic stirrer comprising a bar magnet 38, which rotates within chamber 34, defined by the support plate 26, the lower end of casing 32 and the inner floor 42 of outer chamber 30. A conventional electromagnetic motor 44 immediately below floor 42 generates a rotating magnetic field to cause rotation of the bar magnet. This rotation imparts a rotary movement to the fluid within the lower chamber 34. Aperture 46 permits the centrifugal force therefrom to expel portions of the fluid out chamber 34 and then upwardly, as inidicated by the arrow. The aperture 46 also permits bubble escape from beneath support plate 26. It is preferable that the aperture be located closely below the support plate so that there is no entrapment of the bubble.

The vertical support bar 12 is preferably provided with an upward extension 48 and a radial hook 50 to facilitate removal of the disc assembly from casing 32.

Casing 32 is preferably kept centered by three equally spaced studs 52 on the wall of the outer chamber 32.

To use the apparatus just described, the disc array is first weighed and then coated by dipping or spraying it with a coating composition. The coating is then dried to produce a finished coating substantially identical to actual use coatings in the field. It is then subsequently weighed to determine the amount of coating thereon. The disc array is then placed into casing 32 and the casiing set in place in chamber 30. The latter is then completely filled with a predetermined volume or weight of test fluid, such as tetrahydrofuran, and the outer chamber 30 sealed with screw cap 32.

Means are provided for maintaining any desired temperature or timed sequence of temperature variation. This may be accomplished by placing the entire equipment illustrated in the drawing into a constant temperature oven or water bath. Thermostatically controlled temperature of 31° C. is a typical temperature utilized. A large number of individual units of such equipment can be simultaneously used in such a bath, and in addition, a substantial supply of test fluid for filling the chambers 30 can be kept in the same bath for convenient and quick filling of new test units.

The slow percolation of test fluid will, if it has a solvent power on the coating, leach or dissolve all or part of the exposed surface of the coating. After a predetermined time, such as an hour, a week or longer, but commonly about eighteen hours, the equipment is lifted out of the bath, and disassembled. A small quantity of the test fluid is poured off to enable grasping of the radial arm 50 to lift the disc array out of the chamber. Execess liquid is allowed to drip off or evaporate. The array with any coating thereon is then accurately weighed, and the difference between the initial weight and this weight is determined to give an accurate quantitative measure of the degree of attack and deterioration that has occurred. The exposed surface of the top disc 10 is also available for Brinell or other less drastic hardness tests to ascertain to what extent the coating not removed has been softened.

It should be obvious that a different variety of coating materials can be tested in this manner, and that an equal variety of testing fluids can be employed. Specifically, saran coating can be tested using tetrahydrofuran solvent with or without toluene mixed in as an inert extender. Also nitrocellulose lacquer coatings, such as used on cellophane can be tested using acetone or again, tetrahydrofuran and toluene mixtures. Likewise, lacquer coatings can be tested with alcohol-water mixtures. Reference is now made to a specific example to illustrate such testing.

EXAMPLE

Fourteen identically coated disc arrays were tested for eighteen hours at 31° C. in mixtures of tetrahydrofuran and toluene, the specific concentration of the furan being 5, 15, 18, 21, 24, 26, 27, 28, 30, 31, 33, 35, 38 and 39 percent.

After such testing, the amount of removal of the coating was determined. These values were correlated with actual use conditions and it was found that good correlation existed.

It is to be understood that the following claims are intended to cover all of the generic and specific features of the invention herein described, and all statements of the scope of the invention, which, as a matter of language, might be said to fall therebetween.

Now that the invention has been described, what is claimed as new and desired to be secured by Letters Patent is:

1. Apparatus for analyzing plastic coating material comprising a closed chamber, an inner open-ended tubular chamber within said closed chamber and provided with a porous plate intermediate its ends, a stacked array of plates secured to a common support bar contained within said inner chamber above said porous plate, said closed chamber being provided with means to uniformly agitate a solvent containing mixture over said plates, whereby coating material previously applied to said plates is at least partially lost to said solvent containing mixture.

2. Apparatus for analyzing plastic coating material comprising a closed chamber, an inner open-ended tubular chamber within said closed chamber and provided with a porous plate intermediate its ends, a stacked array of plates secured to a common support bar contained within said inner chamber above said porous plate, said closed chamber being provided with means to uniformly agitate a solvent containing mixture over said plates, comprising a bar magnet rotatable by an electromagnetic motor immediately adjacent the outer wall of said closed chamber whereby coating material previously applied to said plates is at least partially lost to said solvent containing mixture.

3. Apparatus for analyzing plastic coating material comprising a closed chamber formed of a screw cap jar, an inner open-ended tubular chamber within said closed chamber and provided with a porous plate intermediate its ends, a stacked array of perforated plates secured to a common support bar contained within said inner chamber above said porous plate, said closed chamber being provided with means to uniformly agitate a solvent containing mixture over said plates, a comprising a bar magnet located below said porous plate and rotatable by an electromagnetic motor immediately adjacent the outer wall of said closed chamber whereby coating material previously applied to said plates is at least partially lost to said solvent containing mixture.

References Cited by the Examiner

UNITED STATES PATENTS

| | | | |
|---|---|---|---|
| 2,573,067 | 10/1951 | Sandberg. | |
| 2,604,381 | 7/1952 | Hill | 73—86 X |
| 3,042,265 | 6/1962 | Rodth. | |
| 3,080,747 | 3/1963 | Kerst | 73—86 X |
| 3,128,780 | 4/1964 | Worrell | 73—150 X |

DAVID SCHONBERG, *Primary Examiner.*

LOUIS R. PRINCE, *Examiner.*

MICHAEL B. HEPPS, *Assistant Examiner.*